(12) United States Patent
Thiebes et al.

(10) Patent No.: US 7,517,559 B2
(45) Date of Patent: Apr. 14, 2009

(54) COATINGS FOR FOOD CONTAINERS

(75) Inventors: Christoph Thiebes, Köln (DE); Beate Baumbach, Burscheid (DE); Eduard Hänsel, Langenfeld (DE); Wolfram Küttner, Bergisch Gladbach (DE); Christian Wamprecht, Neuss (DE)

(73) Assignee: Bayer MaterialScience AG, Leverkusen (DE)

( * ) Notice: Subject to any disclaimer, the term of this patent is extended or adjusted under 35 U.S.C. 154(b) by 699 days.

(21) Appl. No.: 10/969,144

(22) Filed: Oct. 20, 2004

(65) Prior Publication Data

US 2005/0129847 A1 Jun. 16, 2005

(30) Foreign Application Priority Data

Oct. 24, 2003 (DE) ............... 103 49 811

(51) Int. Cl.
*B05D 3/02* (2006.01)
(52) U.S. Cl. .............. 427/388.1; 427/388.2; 427/388.5; 528/45
(58) Field of Classification Search ............ 528/45; 427/388.1, 388.2, 388.4, 388.5
See application file for complete search history.

(56) References Cited

U.S. PATENT DOCUMENTS 4,452,954 A * 6/1984 Schade et al. .......... 525/440.02

FOREIGN PATENT DOCUMENTS

CA 2235763 6/1997
WO WO98/32807 * 7/1998

OTHER PUBLICATIONS

Popular Plastics & Packaging, Aug. 2001, pp. 66-70, K.R. Kumar, "Internal lacquers of Metallic food containers".
Polyurethane für Lacke und Beschichtungen, (month unavailable) 1999, pp. 18-35, Dr. Manfred Bock, "Chemische und technologische Grundlagen".
Liebigs Annalen der Chemie, vol. 562, (month unavailable) 1949, pp. 205-299, Von Siegfried Petersen, "Niedermolekulare Umsetzungsprodukte aliphatischer Diisocyanate".
J. Prakt. Chem., 336, (month unavailable) 1994, pp. 185-200, Hans Josef Laas et al, "Zur Synthese aliphatischer Polyisocyanate-Lackpolyisocyanate mit Biuret-, Isocyanurat- oder Uretdionstruktur".

* cited by examiner

*Primary Examiner*—Erma Cameron
(74) *Attorney, Agent, or Firm*—Connolly Bove Lodge & Hutz LLP

(57) ABSTRACT

The present invention relates to inner coatings of metal food containers and packaging and to a process for their production. The coatings are applied to the inside of at least a portion of the surface area of containers that are in direct contact with foods or other consumable products and subsequently cured. The coatings include
  a) at least one polyisocyanate containing an average of at least two NCO groups per molecule, at least 95% of the NCO groups being blocked with a blocking agent, and
  b) at least one polyhydroxyl compound containing an average of at least two hydroxyl groups per molecule that react with NCO groups.

14 Claims, No Drawings

COATINGS FOR FOOD CONTAINERS

CROSS REFERENCE TO RELATED PATENT APPLICATION

The present patent application claims the right of priority under 35 U.S.C. §119 (a)-(d) of German Patent Application No. 103 49 811.7, filed Oct. 24, 2003.

BACKGROUND OF THE INVENTION

1. Field of the Invention

The present invention relates to inner coatings of metal food containers and packaging. "Inner coating" is understood as meaning a coating which is in direct contact, especially over a prolonged period, with the food or other consumable product present in the coated container.

2. Description of the Prior Art

It is known to use one-component polyurethane stoving lacquers (1-C PUR stoving lacquers), consisting mainly of a blocked polyisocyanate as crosslinking component and a polyol as binder component, as coating compositions for e.g. motor vehicle priming, general industrial lacquering and coil coating. 1-C PUR stoving lacquers are lacquers which cure at elevated temperatures to form a polyurethane network, the hydroxyl groups of a polyol reacting with the blocked NCO groups of a polyisocyanate. On the other hand, the reaction of polyols with NCO groups blocked with CH-acidic esters is a transesterification in which no polyurethane network is formed, so lacquers based on such blocked polyisocyanates are not called 1-C PUR stoving lacquers.

An inherent problem of the use of blocked polyisocyanates for the production of polyurethane coatings is mentioned e.g. in "Polyurethane für Lacke und Beschichtungen", pages 18 to 35 (M. Bock, Vincentz Verlag, Hannover, (1999): Depending on the type of blocking agent and the stoving conditions, a greater or lesser proportion of the blocking agent remains in free form in the coating. It is also explained that the residual content of blocking agent depends on the particular blocking agent itself and its reactivity.

In the production of coatings of metal packaging, known as can coating, sheets of e.g. tinned iron or aluminium are coated with a stoving lacquer and, after the lacquer has cured, the sheets are processed to the desired commodities. High demands are made on the coating here, especially if it is the inner coating of food containers, for example drinks cans. On the one hand, the lacquers must be flexible enough to withstand deformations during the manufacture of the containers and during transportation of the ready-packed goods without the coating being damaged (e.g. by cracking), and on the other hand the metal substrate must be reliably protected from the effect of corrosive media. In addition, the coating must adhere to the metal substrate, both during deformation and during subsequent sterilization, as is necessary particularly in the case of containers used for packaging foods and drinks. It is undesirable for constituents of the coating to migrate into the packaged goods during manufacture and storage, since this can impair the characteristics of the product.

The state of the art, described in "Internal lacquers of metallic food containers", K. R. Kumar, Popular Plastics & Packaging, 8/2001, pages 66-70, encompasses the use of coating compositions based on bisphenol A diglycidyl ether (BADGE). It is known that small amounts of this substance, which has a mutagenic action when tested in vitro, can migrate into the packaged foods. It would therefore be advantageous to use BADGE-free coating compositions for the inner coating of cans that are in contact with foods.

The use of polyurethane powder coatings based on polyisocyanates and polyols for the production of inner coatings of packaging containers is described in DE-A 19 545 424. However, it is not known to use polyurethane lacquers based on blocked polyisocyanates for coating the major part of food containers that are in permanent contact with the food. This is attributable to the fact that it is known to those skilled in the art, inter alia from "Polyurethane für Lacke und Beschichtungen", pages 18 to 35 (M. Bock, Vincentz Verlag, Hannover, 1999), that such coatings have a residual content of free blocking agent. It had to be assumed, therefore, that these chemicals would migrate into the contents and could change or spoil the taste or, in the worst case, damage the consumer's health. The textbook cited above points out that polyisocyanates blocked with diethyl malonate are permitted for the production of crown cork seals. However, although it is known that said compounds do not eliminate the diethyl malonate blocking agent during the crosslinking reaction, a transesterification takes place with the release of ethanol. In view of the relatively small area of a crown cork seal in relation to the overall surface area of the container, and hence the very small amount of ethanol migrating into the food, said ethanol can be ignored, especially in the case of foods and other consumable products that contain alcohol anyway.

Coating systems based on blocked polyisocyanates which eliminate the blocking agent during crosslinking have therefore never been considered for the coating of surfaces that are in direct contact with foods, because the eliminated blocking agents could constitute a potential toxicological risk.

The object of the present invention was to provide coating compositions for coating the inside of preferably metal food packaging that is in permanent contact with foods, which do not exhibit these disadvantages.

SUMMARY OF THE INVENTION

The present invention is directed to a coating composition that includes
a) at least one polyisocyanate containing an average of at least two NCO groups per molecule, at least 95% of the NCO groups being blocked with a blocking agent,
b) at least one polyhydroxyl compound containing an average of at least two hydroxyl groups per molecule that react with NCO groups, and optionally
c) one or more auxiliary substances and additives selected from the group consisting of solvents, plasticizers, flow control agents, pigments, fillers and catalysts for accelerating the crosslinking reaction.

The present invention is also directed to a method of coating the inside of at least a portion of the surface area of containers that are in direct contact with foods of other consumable products, the method including
applying coating compositions that include
a) at least one polyisocyanate containing an average of at least two NCO groups per molecule, at least 95% of the NCO groups being blocked with a blocking agent, and
b) at least one polyhydroxyl compound containing an average of at least two hydroxyl groups per molecule that react with NCO groups, and
curing the coating compositions.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

Coating compositions for coating the inside of food packaging that do not exhibit the above-described disadvantages have been achieved by using coating compositions described in greater detail below, consisting of a) at least one polyisocyanate containing an average of at least two NCO groups per molecule, at least 95% of the NCO groups being blocked with a blocking agent,
b) at least one polyhydroxyl compound containing an average of at least two hydroxyl groups per molecule that react with NCO groups, and
c) optionally auxiliary substances and additives, for coating the inside of the major part of the area of containers that are in direct contact with foods. The coating compositions are applied to an optionally precoated metal substrate and cured at elevated temperatures.

The present invention also provides the substrates coated according to the invention and the products manufactured from these substrates.

Surprisingly, either the layers obtained according to the invention no longer contain relevant amounts of free blocking agents, or the latter do not migrate—as supposed per se—into the packaged foods. In any case, relevant amounts of coating compositions are not found in the foods, even when the inner surface of the container is completely covered with the coating compositions used according to the invention, as is the case e.g. of drinks cans. Accordingly, the teaching according to the invention overcomes a prejudice that existed previously.

The coating compositions according to the invention can be prepared by mixing components a)-c) in any desired order.

The blocked polyisocyanates (a) can be prepared by the methods known from the state of the art. These are described e.g. in Liebigs Annalen, 1949, volume 562, pages 205 to 229.

Preferably monomer-poor polyisocyanates prepared by modifying especially aliphatic, cycloaliphatic, araliphatic and/or aromatic diisocyanates, synthesized from at least two diisocyanates and preferably having a uretdione, isocyanurate, urethane, allophanate, biuret, iminooxadiazinedione and/or oxadiazinethione structure, such as those known e.g. from "Polyurethane für Lacke und Beschich-tungen", pages 18 to 35 (M. Bock, Vincentz Verlag, Hannover, 1999), or J. prakt. Chem. 336 (1994), pages 185 to 200, or mixtures of these compounds, can be used as polyisocyanates to be blocked.

Suitable diisocyanates are, in particular, any desired diisocyanates obtainable by phosgenation or by phosgene-free processes, for example by the thermal elimination of urethane, having a molecular weight in the range 140 to 400 g/mol and containing aliphatically, cycloaliphatically, araliphatically and/or aromatically bonded isocyanate groups, e.g. 1,4-diisocyanatobutane, 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane (H12MDI), 1-isocyanato-3,3,5-trimethyl-5-isocyanatomethylcyclohexane (isophorone diisocyanate, IPDI), 1-isocyanato-1-methyl-4(3)-isocyanatomethylcyclohexane (IMCI), 4,4'-diisocyanatodicyclohexylmethane, bis(isocyanatomethyl)-norbornane, 1,3- and 1,4-bis(2-isocyanatoprop-2-yl)benzene (TMXDI), 2,4- and 2,6-diisocyanatotoluene (TDI), 2,4'- and 4,4'-diisocyanatodiphenylmethane, 1,5-diisocyanatonaphthalene or any desired mixtures of such diisocyanates.

The polyisocyanates are preferably polyisocyanates or polyisocyanate mixtures of said type with exclusively aliphatically and/or cycloaliphatically bonded isocyanate groups. Particularly preferred polyisocyanates or polyisocyanate mixtures are those with an isocyanurate structure and/or an iminooxadiazinedione and/or biuret structure based on HDI, IPDI and/or 4,4'-diisocyanatodicyclohexylmethane, or mixtures of these compounds. Very particularly preferred polyisocyanates are those based on IPDI with an isocyanurate structure.

To match the use properties of the products according to the invention to the particular profile of requirements (raising the crosslinking density by increasing the mean blocked NCO functionality in the finished hardener, influencing the elasticity by means of rigidifying/plasticizing components, etc.), a so-called pre-extension can be carried out in addition to the blocking reaction. This is done by adding substoichiometric amounts of alcohols, amines and/or amino alcohols to the polyisocyanate component containing free isocyanate groups, the above-mentioned pre-extenders containing at least 2 OH or NH groups per molecule. Compounds that are particularly suitable for this purpose are optionally branched diols and triols optionally containing cycloaliphatic segments, which preferably contain (on average) 3 to 30 C atoms and whose C chain can optionally be interrupted by functional groups, especially ether and ester groups. It is particularly preferable to use $C_3$-$C_{12}$ diols and triols as well as all the isomers and any desired mixtures of the following list of compounds with one another: propanediols, butanediols, pentanediols, hexanediols, heptanediols, octanediols, nonanediols, decanediols, trimethylolethane and trimethylolpropane. Subsequently or simultaneously, the NCO groups not "consumed" as a result of the above-mentioned pre-extension are reacted by adding the appropriate blocking agent.

Suitable blocking agents for the preparation of component a) are the compounds reactive towards NCO groups that are known from the state of the art, such as alcohols, lactams, oximes like butanone oxime, phenols, alkyl hydroxybenzoates, pyrazoles and triazoles, and amines, e.g. 1,2,4-triazole, 3,5-dimethyl-1,2,4-triazole, 3,5-dimethylpyrazole, 1H-imidazole, pyrazole, diisopropylamine, acetone oxime, ε-caprolactam or any desired mixtures of these blocking agents. It is preferable to use ε-caprolactam and aliphatic alcohols having a molecular weight of <100, or mixtures of these compounds. It is very particularly preferable to use ε-caprolactam.

Another possibility is firstly to react part of the diisocyanates or polyisocyanates with blocking agents and then to carry out a conversion to polyisocyanates having the above-mentioned structures.

The blocked polyisocyanates (a) can optionally be prepared in a suitable solvent inert towards isocyanate groups. Examples of suitable solvents are the lacquer solvents conventionally used per se, e.g. ethyl acetate, butyl acetate, 1-meth-oxyprop-2-yl acetate, 3-methoxy-n-butyl acetate, acetone, 2-butanone, 4-methyl-2-pentanone, cyclohexanone, toluene, xylene, N-methylpyrrolidone and chlorobenzene. Mixtures containing especially higher-substituted aromatics, such as those marketed for example under the names Solvent Naphtha, Solvesso® (Exxon Chemicals, Houston, USA), Cypar® (Shell Chemicals, Eschborn, Del.), Cyclo Sol® (Shell Chemicals, Eschborn, Del.), Tolu Sol® (Shell Chemicals, Eschborn, Del.) and Shellsol® (Shell Chemicals, Eschborn, Del.), are also suitable. However, it is also possible to add solvents after preparation of the blocked polyisocyanates according to the invention, for example to lower the viscosity. Alcohols, for example isobutyl alcohol, can also be used in this case because the NCO groups present then react completely with the isocyanate-reactive groups of components (b) and (c).

The compounds used as lacquer binders (b) contain an average of at least two hydroxyl groups per molecule that react with NCO groups.

It is preferable to use the organic polyhydroxyl compounds known in polyurethane lacquer technology, for example the conventional polyesterpolyols, polyacrylatepolyols, polyurethanepolyols, polycarbonatepolyols, polyetherpolyols, polyesterpolyacrylatepolyols and polyurethanepolyacrylatepolyols, polyurethanepolyesterpolyols, polyurethanepolyetherpolyols, polyurethanepolycarbonatepolyols, poly: esterpolycarbonatepolyols and phenol-formaldehyde resins, on their own or in mixtures. It is preferable to use polyesterpolyols synthesized from at least one component containing hydroxyl groups and one component containing carboxyl groups.

The polyhydroxyl compounds used are preferably those having an average molecular weight Mn of 500 to 10,000 and an OH content according to DIN 53 240/2 of 0.5 to 30%.

The polyesterpolyols used are preferably synthesized from toxicologically safe constituents, examples being 1,2-propanediol, neopentyl glycol, 1,1,1-trimethylolpropane, adipic acid and maleic anhydride.

The equivalent ratio of blocked and non-blocked NCO groups to NCO-reactive groups is between 0.4:1.0 and 1.0:1.5, preferably between 0.4:1.0 and 0.8:1.0 and particularly preferably 0.5:1.0.

Auxiliary substances and additives (c) which can be used are plasticizers, flow control agents, pigments, fillers or catalysts for accelerating the crosslinking reaction.

Catalysts which can be used are the compounds known in polyurethane chemistry which accelerate the reaction of isocyanate groups with hydroxyl groups, examples being tin, zinc, zirconium, bismuth and titanium compounds. If catalysts are used, they are preferably non-toxic; examples which may be mentioned are butyltin tris(2-ethylhexanoate), tin tetra(2-ethylhexanoate), tetrabutyl titanate and tin(II) octoate.

It is also possible to use as additional crosslinking components other compounds that react with NCO-reactive groups, examples being aminoplast resins. These are to be regarded as the condensation products of melamine and formaldehyde, or urea and formaldehyde, known in lacquer technology. All the conventional melamine-formaldehyde condensation products which are non-etherified or etherified with saturated monoalcohols having 1 to 4 C atoms are suitable. In the case of the concomitant use of other crosslinking components, the amount of binder with NCO-reactive hydroxyl groups or the amount of constituents containing NCO groups must be adapted accordingly.

Each of components (a) to (c) can optionally be used as a solution in an organic solvent or water. However, solvents can also be added after components (a) to (c) have been mixed, for example to lower the viscosity.

Examples of suitable solvents are water or the lacquer solvents conventionally used per se, e.g. ethyl acetate, butyl acetate, 1-methoxyprop-2-yl acetate, 3-methoxy-n-butyl acetate, acetone, 2-butanone, 4-methyl-2-pentanone, cyclohexanone, toluene, xylene, N-methylpyrrolidone and chlorobenzene. Mixtures containing especially higher-substituted aromatics, such as those marketed for example under the names Solvent Naphtha, Solvesso® (Exxon Chemicals, Houston, USA), Cypar® (Shell Chemicals, Eschborn, Del.), Cyclo Sol® (Shell Chemicals, Eschborn, Del.), Tolu Sol® (Shell Chemicals, Eschborn, Del.) and Shellsol® (Shell Chemicals, Eschborn, Del.), are also suitable.

It is preferable according to the invention to use coating compositions based on blocked isocyanates, dissolved in organic solvents. It is also possible, however, to use aqueous coating composition systems or powder coatings accordingly.

Care should be taken to ensure that, in the course of the preparation of coating systems to be used according to the invention, constituents (a) to (c) are mixed below the temperature at which the blocked NCO groups are capable of reacting with the other constituents. The mixing preferably takes place at temperatures of between 15 and 100° C.

The lacquers are applied directly to the metal substrate, or to layers of lacquer already applied to the substrate, by methods known from the state of the art, for example by spraying, dipping or flow coating or by using rolls or doctor blades.

The amount of coating composition applied is such that the dry film layer thickness of the inner coating is 1 to 50 µm, preferably 3 to 20 µm and very particularly preferably 8 to 12 µm, after evaporation of any solvent present and after curing of the coating.

To cure the coatings after application of the lacquers, the substrates are heated at temperatures of between 100° C. and 400° C., preferably between 180° C. and 260° C. and very particularly preferably between 190° C. and 230° C., and stored at this temperature for 100 minutes to 1 second, preferably 30 minutes to 15 seconds and particularly preferably 15 minutes to 20 seconds. The heating can be effected batchwise in stoving ovens or continuously in belt coating units or so-called coil coating units.

To produce the food containers, the metal substrates coated in this way can be deformed or afterwards during the packaging of the foods.

In terms of the present invention, foods and other consumable products are understood as meaning comestibles in the broadest sense or animal foods. These are liquid, solid or semisolid goods containing e.g. water, fats, alcohol and/or protein. Examples of these goods are coffee, tea or coffee and tea extracts, drinks containing fruit and/or carbonic acid, such as fruit and vegetable juices, wine, lemonade, beer, champagne and sparkling wine, as well as mixtures of these drinks, and preserved fish, meat, vegetables or fruit, which are optionally cooked or frozen in the coated containers.

The coatings obtained are resistant to corrosive media, deformable and capable of adhering to optionally precoated metal substrates under sterilization conditions.

EXAMPLES

Examples 1 to 3

All percentages in the Examples below are wt. %, unless indicated otherwise.

Starting materials:

Blocked Polyisocyanate 1

124.3 g (1.1 eq.) of ε-caprolactam were added to 391.6 g (1.1 eq.) of a lacquer polyisocyanate based on isophorone diisocyanate (IPDI) and containing isocyanurate groups and 30 wt. % of Solventnaphtha® 100, and the mixture was heated to 90° C. over 30 min and stirred for a further 4 h at 90° C., after which free NCO groups could no longer be detected by IR spectroscopy. After dilution with 60 g of Solvesso 200S and 120 g of Solvesso 150, 695.9 g of a clear colourless product having the following characteristics are obtained:

Solids content: 60%

BNCO content: 7.0%

Viscosity at 23° C.: 4000 mPas

Polyester 1

A polyester containing hydroxyl groups, prepared according to DE-A 4 100 204 from 1,2-propanediol, neopentyl glycol, trimethylolpropane, adipic acid and maleic anhydride, 75% solution in Solventnaphtha® 100, with an OH content of 2.0% as determined according to DIN 53 240/2, viscosity 3800 mPas.

Phenol-Formaldehyde Resin 1:

456 g of isobutanol, 456 g of bisphenol A and 292 g of 37% formaldehyde solution are placed in a 5 l round-bottom flask at RT. The mixture is heated to 60° C., 12.56 g of trisodium phosphate dodecahydrate are added and the resulting mixture is heated to 91° C. over 60 minutes. After stirring for 6 h at this temperature, it is cooled to 70° C. and then adjusted to pH 2 with 12.4 g of 85% phosphoric acid. The aqueous phase is separated off and a further 3.5 g of 85% phosphoric acid and 608 g of isobutanol are added. Isobutanol is then distilled off under vacuum until the solids content reaches 60 wt. %.

Clear lacquers were prepared by intimately mixing the following ingredients at room temperature, applied with a doctor blade to 8 cm wide and 9 cm long E1 tinned steel plates from Hoesch and stoved for 12 min at 200° C. in a circulating air oven. A dry film layer thickness of 8-12 μm was obtained.

|  | Example | | |
|---|---|---|---|
|  | Ex. 1 according to the invention | Ex. 2 according to the invention | Comparative Ex. 1 |
| Ingredient |  |  |  |
| Blocked polyisocyanate 1 | 17.9 g | 31.7 g |  |
| Phenol-formaldehyde resin 1 |  | 20.6 g | 13.8 g |
| Polyester 1 | 50.7 g | 24.8 g |  |
| Epikote ® 1007[a] |  |  | 82.9 g |
| BYK 301[b] | 0.2 g | 0.2 g |  |
| Metatin ® S 26[c]/Fascat ® 4102[d] (3:1 mixture), 2% solution in Solvesso ® 200S | 2.4 g |  |  |
| Solvesso ® 150 | 28.8 g | 22.7 g |  |
| Phosphoric acid, 10% in n-butanol |  |  | 3.3 g |
| Lacquer property |  |  |  |
| Adhesion in cross-cut test[e] | 0 | 0-1 | 0-1 |
| Impact resistance test[f] | 0 | 36 | 27 |
| Deep-drawing cup[e,g,h] | 0 | 0 | 0 |
| Stacking resistance[i] | no impression | no impression | no impression |
| MEK wipe test (1 Kp pressure) | >100 × (soft) | >100 × (hard) | >100 × (soft) |
| Sterilization[g,k] | no change | no change | no change |

[a] epoxy resin based on epichlorohydrin/bisphenol A and containing BADGE
[b] 52% solution of a polyether-modified polydimethyldisiloxane in butyl glycol
[c] tin(II) octoate
[d] butyltin tris(2-ethylhexanoate)
[e] 0 = good, 5 = poor
[f] Erichsen 471 impact resistance tester, impact hammer 2300 g, fall height 650 mm, crack length given in mm
[g] Erichsen cupping tester
[h] evaluated according to DIN 53 230
[i] Coated plates are stacked with the lacquered sides facing one another. A black belt filter is placed between the coated plates. The stack is loaded with a steel plate, for better weight distribution, and a 5 kg stone weight and then stored for 16 h (overnight) at 50° C. After storage, any damage to the film (trace impressions on the filter paper) is recorded.
[k] Aesculap sterilizer, 2 h at 1.2 bar/121° C.; the coating is examined for loss of adhesion (stripping), loss of gloss, water spots and bubbling.

The plates coated according to the invention were stored for 2 h at 121° C. in 120 ml of a mixture of equal volumes of ethanol and water. The liquid was then examined chromatographically for liberated blocking agent. No liberated blocking agent was found with a detection limit of 3 μg/l.

It is seen that the coating composition used according to the invention produces lacquer films which satisfy the requirements of an inner coating of cans that come into contact with foods, and overall exhibit better properties than the coating produced according to the state of the art.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method of coating the inside of at least a portion of the surface area of containers that are in direct contact with foods or other consumable products comprising
    applying a coating composition comprising
        a component (a) at least one polyisocyanate containing an average of at least two NCO groups per molecule, at least 95% of the NCO groups being blocked with a blocking agent, and
        a component (b) at least one polyhydroxyl compound containing an average of at least two hydroxyl groups per molecule that react with NCO groups, and
    curing the coating composition.

2. The method according to claim 1, wherein polyisocyanates containing isocyanurate and/or iminooxadiazinedione groups are used as component (a).

3. The method according to claim 1, wherein polyisocyanates based on 1,6-hexane diisocyanate and/or isophorone diisocyanate and/or 4,4'-diisocyanatodicyclohexylmethane are used as component (a).

4. The method according to claim 1, wherein polyisocyanates based on isophorone diisocyanate are used as component (a).

5. The method according to claim 1, wherein the isocyanate groups present in component (a) are blocked with lactams, oximes, phenols, alkyl hydroxybenzoates, pyrazoles and/or secondary aliphatic amines.

6. The method according to claim 1, wherein the isocyanate groups present in component (a) are blocked with ε-caprolactam.

7. The method according to claim 1, wherein the polyhydroxyl compounds present in component (b) have a content of OH groups of 0.5 to 30 wt. %.

8. The method according to claim 1, wherein the polyhydroxyl compounds present in component (b) have a molecular weight of between 400 and 10,000.

9. The method according to claim 1, wherein the polyhydroxyl compounds present in component (b) contain polyesters.

10. The method according to claim 1, wherein the coating is cured at temperatures of between 100 and 400° C.

11. The method according to claim 10, wherein the coating is cured at temperatures of between 190 and 230° C.

12. The method according to claim 1, wherein the coating composition contains an organic solvent.

13. The method according to claim 1, wherein the coating composition contains a catalyst.

14. The method according to claim 1, wherein the coating composition further comprises c) one or more additional ingredients selected from the group consisting of plasticizers, flow control agents, pigments, fillers and catalysts for accelerating the curing reaction.

* * * * *